United States Patent Office 3,357,813
Patented Dec. 12, 1967

3,357,813
METHOD OF ACIDULATING PHOSPHATE ROCK AND PRODUCT THEREOF
Jesse Elson, Doylestown, Pa., assignor to Delaware Valley College of Science and Agriculture, Doylestown, Pa., a non-profit corporation of Pennsylvania
No Drawing. Filed June 6, 1966, Ser. No. 555,277
20 Claims. (Cl. 71—23)

The present application is a continuation-in-part of my co-pending application Ser. No. 351,204 filed Mar. 11, 1964, now abandoned, and of my co-pending application Ser. No. 368,223 filed July 15, 1953, and now abandoned.

The present invention relates to improved phosphate fertilizers, either per se or as a part of any of the common commercial fertilizer admixtures which generally comprise (a) a superphosphate or phosphatic-carrier, (b) a nitrogenous material or nitrogen-carrier and (c) a potassium compound or potassium-carrier. Such commercial fertilizer admixtures are generally designated as "NPK," and the ratio of the nitrogen, phosphorous and potassium content thereof is designated by numbers representing their relative proportions in the admixture. Thus, for instance, the designation 5:10:5 indicates that the admixture contains 5% of nitrogen on an elemental basis, 10% of phosphorous on a $P_2O_5$ basis, and 5% potassium on a $K_2O$ basis.

The phosphatic carrier may be either the superphosphate or phosphoric acid or salts of phosphoric acid such as diammonium-phosphate. The nitrogenous material or nitrogen carrier may be ammonia, an ammonium salt, urea, a nitrate or other nitrogen-containing compounds. The potassium compound or potassium carrier may be potassium chloride, potassium sulphate or other potassium-containing compounds.

The present invention further relates to the method of making a superphosphate fertilizer and to the method of acidulating phosphate rock and to the products of such methods, whereby the manufacture of the superphosphate by the wet process and the acidulation of the phosphate rock can be carried out more effectively and more efficiently and whereby the superphosphate or end-products of such acidulation will be more effective as fertilizers.

One of the objects of the present invention is more effectively to incorporate in a phosphatic fertilizer, as, for instance, in a superphosphate, a small amount of a metal-complexing agent (including but not limited to chelating agents) having the property of protecting the soluble acid phosphate (or soluble phosphatic carrier) from reverting to an insoluble tricalcium phosphate or to other di- or tri-metal phosphates, either while such superphosphate or phosphatic fertilizer is in storage or when it is in contact with the soil.

Another object of the present invention is to disperse and to keep dispersed the solid particles of ground phosphate rock powder and the acidulated and partly acidulated particles of such ground phosphate rock (during the acidulation of such phosphate rock) so as to cause a better penetration of the acid and a more intimate union of the complexing agent with the resultant phosphatic fertilizer and also to prevent the particles of ground phosphate rock powder and the acidulated or partly acidulated particles of such ground phosphate rock powder from "balling up" during the acidulation and to prevent said particles from forming hard masses during the drying-out of the acidulated rock.

With the above and other objects in view which will appear more fully from the following more detailed description, in one aspect thereof the present invention consists of acidulating ground phosphate rock by means of any of the commonly-used acidulating acids in the presence of a metal-complexing agent and in the presence of a particle-dispersing agent.

In a preferred embodiment of the present invention the phosphate rock is acidulated in the presence of a small amount of an agent which is both a metal-complexing agent and a particle-dispersing agent, namely an agent having such dual properties—although I may also acidulate the phosphate rock in the presence of a separate metal-complexing agent and a separate particle-dispersing agent. Such agents may be incorporated in the acidulating acid or may be admixed with the ground phosphate rock powder prior to its acidulation.

In another embodiment, my invention may also include a small amount of a surfactant or wetting agent in the acidulating acid or added to the crushed phosphate rock or added to the metal-complexing agent or to the particle-dispersing agent.

The complexing agent may be any metal-complexing agent having the aforementioned property of protecting the phosphatic fertilizer from reverting to an insoluble phosphate, including but not limited to chelating agents, as, for instance, those referred to in my co-pending application Ser. No. 351,204 filed Mar. 11, 1964, and now abandoned, or (as, for instance) referred to in U.S. Patents 3,008,816 and 3,118,730 and other U.S. patents. Such complexing agents having the aforementioned property need not also be chelating agents, as, for instance, non-chelating metal-complexing agents such as the lignosulphonates exemplified by the sodium lignosulphonates, and other tree-derived or bark-derived compounds such as the water-soluble organic metal-complexing agents which are the modified polyflavonoid copolymers marketed by Rayonier Incorporated under the trademark "Rayplex" and water-soluble class of polyphenolics consisting of 15 carbon atom copolymers of catechin and leucocyanidin exemplified by the product marketed by Rayonier Incorporated under the trademark "Rayflo-C."

Thus, I have found, that by incorporating a metal-complexing agent in the acidulating acid or applying it to the finely crushed phosphate rock before acidulation, the metal-complexing agent becomes more intimately and effectively united with the particles of the finished superphosphate and becomes more readily available for the aforementioned protection thereof and becomes more effective for such protection.

As a metal-complexing agent (for incorporation during the acidulation of the ground phosphate rock) I may also use the wood-sugar acids recoverable from waste sulphite liquor produced in the sulphite wood-pulping processes.

In the heretofore conventional manufacture of phosphatic fertilizers, wherein finely ground rock phosphate is acidulated with concentrated acid solutions (nitric acid, sulfuric acid, phosphoric acid or hydrochloric acid), there is a tendency for the ground phosphate rock powder to "ball up" during its acidulation thereby hindering the further penetration of the acid and forming hard masses during the subsequent drying-out of the acidulated rock.

I have found that by incorporating a particle-dispersing agent and preferably (though not necessarily) also incorporating a wetting agent (or surfactant) in the acidulation of the phosphate rock, its acidulation progresses more effectively and efficiently without the aforementioned "balling up" of the acid-wetted mass and without the aforementioned hardening into a solid mass of the dried end-product.

I have also found that a water-soluble lignosulphonate, as, for instance, sodium lignosulphonate can be effectively incorporated in the aforementioned acidulating acids by first dissolving the relatively small amount of lignosulphonate in an aqueous solution of a surface-active agent or surfactant and then mixing such combined aqueous solution (of lignosulphonate and surfactant) with the strong acidulating acid. Alternatively, I may first add the surfactant to the acidulating acid and then intermix therewith either the dry powdered lignosulphonate or an aqueous solution of the lignosulphonate. In such admixtures the lignosulphonate likewise does not become insoluble.

Such acidulating acid, having incorporated therein a small amount of a water-soluble lignosulphonate or a small amount of any of the other abovementioned tree-derived or bark-derived metal-complexing agents has the property of rendering the acidulation of the ground rock phosphate more effective and efficient and preventing the balling up of the phosphate rock and the hardening of the acidulated solid matter into hard masses.

I have also found that the water-soluble lignosulphonates and other wood-derived or bark-derived metal-complexing agents exemplified by the aforementioned polyflavonoid-copolymers and the aforementioned polyphenolics will perform the dual function of acting as metal-complexing agents in the final fertilizer end-product, thereby to enhance plant-growth in the manner indicated in my aforementioned applications Ser. No. 351,204 (filed Mar. 11, 1964, now abandoned) and Ser. No. 368,223 (filed July 15, 1953, now abandoned) and of also acting as particle-dispersing agents during the acidulation of the ground phosphate rock to enhance the penetration of the acid and to prevent the aforementioned balling up during acidulation and to prevent the aforementioned hardening of the dried mass of acidulated rock and to increase the efficiency of the acidulation.

While the lignosulphonates and other wood-derived or bark-derived metal-complexing agents tend to precipitate out in concentrated acid so that their particle-dispersing ability would tend to be unavailable in a concentrated acid medium such as required for the acidulation of phosphate rock, I have found that water-soluble lignosulphonates and the other wood-derived or bark-derived metal-complexing agents may be effectively incorporated in the acidulating solution without the formation of agglomerates or lumps thereof (or with but a minimum formation of large particles thereof) by slowly adding such metal-complexing agents in a dry powdered form to the acidulating acid while the latter is agitated and is at a relatively low temperature. An acid temperature below about 150° F. is feasible, but it should preferably be not substantially above ambient temperature.

I have also found that such lignosulphonate and other tree-derived metal-complexing agents may be effectively incorporated in the acidulating acid by intermixing with each other the acidulating acid in an aqueous solution of such metal-complexing agents while the temperature of the acidulating acid is in the aforementioned range and is agitated.

The phosphatic fertilizer produced by the action of the acid on the ground phosphate rock in the presence of the metal-complexing agent has the desirable property of having the metal-complexing agent intimately united with the water-soluble phosphate (or water-soluble phosphoric-acid) and of being better protected thereby against reversion to insoluble phosphates.

The superphosphate fertilizer produced by the action of the acid on the ground phosphate rock in the presence of a lignosulphonate or other wood-derived or bark-derived metal-complexing agent has the aforementioned desirable property affording greater protection against reversion of the acid phosphate to insoluble phosphates and also has the desirable physical properties of being more readily comminuted and remaining in a better state of subdivision (without unduly packing or hardening).

I have found that the resultant phosphate fertilizer has unexpected and greater growth-stimulating effect on plant life, over and above whatever growth-stimulating effect the phosphate would have when not prepared by my present method or when not including the aforementioned metal-complexing agents.

I prefer as particle-dispersing or particle-suspension or suspending agents those having metal-complexing properties in protecting the soluble acid phosphate from reverting to the insoluble tricalcium phosphate or to other insoluble di- or tri-metal phosphates while the fertilizer is in storage or upon contact with the soil, such as, for instance, the lignosulphonates, as, for example, the alkali lignosulphonates (as, for instance, the sodium lignosulphonate potassium lignosulphonate and ammonium lignosulphonate) or the alkaline earth metal lignosulphonates (such as calcium lignosulphonate or magnesium lignosulphonate) or the amine salts of the lignosulphonates, or any of the aforementioned other tree-derived metal-complexing agents having particle-dispersing or particle-suspending properties.

When using a metal-complexing agent which is not also a particle-dispersing or particle-suspending agent I may incorporate any other suitable particle-dispersing or suspending agent, such as (for instance) finely comminuted activated carbon, polymeric electrolytes (such as condensed sodium silicates, polyphosphates, etc.) and various known compounds and derivatives of lignin which are not lignosulphonates. Further examples of such particle-dispersing agents are sodium silicate, sodium polyphosphate, and sodium hexametaphosphate.

Such metal-complexing agents which are not also particle-dispersing (or particle-suspending) agents are exemplified by the metal-complexing wood-sugar acids referred to hereinabove and are also exemplified by the following metal-chelating agents referred to in copending application Ser. No. 368,223 filed July 15, 1953, namely the amino-polycarboxylic compounds exemplified by ethylene-diamine-tetra-acetic-acid which is commonly referred to as ETDA; ammonia-tri-acetic-acid which is commonly referred to as ATA; ammonia-di-acetic-acid, propylene-diamine-tetra-acetic-acid and the butylenediamine-tetra-acetic-acid and their cation-replaceable or cation-exchangeable salts which form chelated-addition complexes with alkaline earth metals such as calcium, as, for instance, their sodium and ammonium salts; the amino-monocarboxylic acids such as glycine, alanine, asparagine, aspartic acid, glutamic acid, leucine, methionine, phenyl-alanine, tryptophane and tyrosine, which readily form chelate-addition complexes with alkaline earh metals such as calcium; the alkaline-earth-metal chelating agents such as alkaline-earth-chelating dicarboxylic acids like malonic acid; ethylmalonic acid; oxalic acid, succinic acid; maleic acid; synthetic alkaline earth metal chelating amino acids (and their salts) including especially the amino-polycarboxylic acids heretofore mentioned and acids such as aminobarbituric acid-N, N-diacetic acid; 2-aminobenzoic acid N,N'-diacetic acid; ammonium-diacetic acid; ammonium-dipropionic acid; aniline diacetic acid; tetra-methylene diamine tetra-acetic acid; alkaline earth metal chelating hydroxy acids such as citric acid; lactic acid; malic acid; salicylic acid; tartaric acid; alkaline earth metal chelating nitro acids such as nitroacetic acid; o-nitrobenzoic acid, as well as other alkaline earth metal chelating agents like oxalacetic acid; pyruvic acid; salicylaldehyde; 2-hydroxy-1-naphthaldehyde; acetylacetone; benzoylacetone; 8-hydroxyquinoline; o-aminobenzene-throl; aminophenol and ethylacetoacetate.

As exemplifying an embodiment of one aspect of the present invention, I may first make a solution of a lignosulphonate and a wetting agent or surfactant. The wetting agent or surfactant may be any anionic nonionic, cationic, amphoteric or polymeric wetting agent or surfactant.

The range of proportions of surfactant and particle-dispersing agent is preferably of the general order of 1:5 to 1:10 of surfactant to dispersing agent.

In the practice of one embodiment or aspect of the present invention, I prepare an aqueous solution of a wetting agent or surfactant and a water-soluble lignosulphonate or other tree-derived particle-dispersing agents exemplified by the abovementioned polyflavonoid copolymers and the polyphenolics or other suitable particle-dispersing or particle-suspending agent. I then mix this aqueous solution with the acidulating acid of initially excessive strength or concentration, such as (for instance) a 97% (by weight) sulphuric acid (specific gravity of 1.84) or a 85% (by weight) phosphoric acid (specific gravity of 1.69), and then bring the mixture of acidulating acid, wetting agent and lignosulphonate to the proper acid-strength, as, for instance, 75% (by weight) of sulphuric acid or 67½% (by weight) of phosphoric acid, etc.—such aqueous solution of wetting agent and lignosulphonate (other than such other particle-dispersing agent) being suitable to reduce the acid-strength from the initially higher concentration.

The amount of surfactant or wetting agent and the amount of the particle-dispersing or particle-suspending agent so admixed with the acidulating acid in such that the aforementioned aqueous solution of acidulating acid will have in it but a very small proportion of the surfactant and of the particle-dispersing agent—namely, of the order of 1 part by weight of particle-dispersing agent and 0.1 to 0.2 part by weight of surfactant to 300 to 500 (or more) parts by weight of pure acid.

This mixture of acidulating acid and the aforementioned solution of surfactant or wetting agent and particle-suspending or particle-dispersing agent is then applied to the ground phosphate rock or the latter is placed into the mixture. Generally, the crushed or powdered phosphate rock is placed into a mixing pan or tank to which the aforementioned solution of acidulating acid, wetting agent and particle-suspending agent is then added, either by spraying it onto the phosphate rock while mixing it and stirring it or by adding it merely by pouring it on while mixing it.

I may also apply the metal-complexing agent and the particle-dispersing agent (or one of the aforementioned lignosulphonates or other abovementioned tree-derived compounds which is both a metal-complexing agent and particle-dispersing agent) directly to the crushed phosphate rock by mechanically intermixing the same therewith or by spraying an aqueous solution thereof onto the ground phosphate rock just before it is acidulated or just before the crushed rock is intermixed with the acidulating acid. In such case, I may add the surfactant to the acid prior to the intermixing of the acid with the so treated ground phosphate rock.

I may also add the metal-complexing agent and the particle-dispersing agent (or one of the aforementioned lignosulphonates or one of the above-mentioned tree-derived compounds which is both a metal-complexing agent and a particle-dispersing agent) along with the surfactant, to the acidulating acid in either of the above-indicated alternative ways before such acid is intermixed with the ground phosphate rock.

As a result of the foregoing, a very rapid acidulation is effected, until all the acidulating acid has been consumed by the phosphate rock—converting a large part of the phosphate rock into calcium acid phosphate and leaving some of the phosphate rock perhaps unconverted or only partly converted, so that all of the acidulating acid is used up or is substantially used up.

The wet mass is then transferred into curing bins or areas where the reaction is permitted to go to completion and where the excess moisture is permitted to evaporate off.

By the method of my invention both the original reaction as well as the curing and drying is more rapid, and the resultant finished product is softer and does not "set up" as hard as when superphosphate is prepared by the prior-art method.

My method or process permits the resultant mass to be more readily broken up and powdered, to produce the dry powdered superphosphate necessary for actual application to the soil (either alone or in admixture with other fertilizer ingredients, such as a nitrogen-carrier and/or a potassium-carrier).

The following are examples of anionic surfactants: sodium alkylbenzene sulphonate (sodium dodecylbenzene sulphonate); also low-molecular-weight sulphonates, alkylaryl sulphonates or petroleum sulphonates (exemplified by the "igepons"), dialkyl esters of sodium sulphosuccinic acid.

The following are examples of nonionic surfactants: fatty alkanolamides, ethylene-oxide-derived nonionic surfactants such as alkylphenol, fatty alcohols, fatty acids, fatty mercaptan, fatty amines, poly-oxy-propylene glycols, fatty sorbitan esters.

The following are examples of amphoteric surfactants: imidazoline and amino acid amphoteric surfactants.

The following are examples of polymeric surfactants: Sodium carboxymethylcellulose, polyacrylates, polyvinylalcholols, methyl cellulose, ethoxylated phenol formaldehyde resins.

Fluorocarbon surfactants may also be used, these being surfactants in which fluorine is substituted for hydrogen.

The following are a few examples of lignosulphonates suitable in the practice of my invention: The Crown-Zellerbach's sodium lignosulphonate known as "Orzan-S." The Marathon Paper Company's lignosulphonate known as "Marasperse" and its product known as "Maracarb," which is a mixture of sodium lignosulphonate and wood-sugar acids recovered from the spent sulphite liquor subsequent to the recovery of the bulk of the lignosulphonates therefrom. The West Virginia Pulp & Paper Company's sodium lignosulphonates known as its "Polyfons," including its so-called "poly–F" sodium lignosulphonate.

After the reaction has been completed by the aforementioned curing, and the bulk of the moisture has been driven off or evaporated, the resultant product may also be further dried by hot air.

The proportion of lignosulphonate or other metal-complexing agent is of the order of 0.05% to 0.35% of the final dry superphosphate resulting from my method.

If a wetting agent or surfactant is also included, it is of the order of 0.01% to 0.07% of such superphosphate.

The resultant superphosphate may also be ammoniated, so as to incorporate the nitrogen thereinto.

In addition to just breaking up the cured mass, it may also be granulated to produce a more uniform and smaller particle size rather than the varying sizes obtained merely by crushing it.

In the resultant fertilizer end-product the lignosulphonate or other tree-derived metal-complexing agent has not only been protected against becoming insoluble in the presence of the acidulating acid, but because of its intimate admixture in the acidulating solution, it is carried directly to every particle of the resultant superphosphate and, in effect, becomes an integral or intimate part of the superphosphate particle perhaps in the sense of coating it or otherwise being intimately connected with it, so that upon the subsequent application of the superphosphate to the soil, the metal-complexing agent becomes more effective in protecting the superphosphate against the insolubilizing effect of the calcium, iron and magnesium in the soil, and the superphosphate becomes better protected and more readily available to the plant.

I have also found that the presence of a surfactant in the acidulating acid also prevents the acid from charring the lignosulphonate or other metal-complexing agent. This enables the lignosulphonate or other particle-dispersing agent to have a greater dispersing capacity during the acidulation of the ground phosphate rock, and also makes the lignosulphonate or other metal-complexing agent more effective in the final end-product. The surfactant also permits a more effective acidulation because its wetting action permits the acid to reach the ground phosphate rock particles more readily.

The following table shows the increase in yield of Sudan Grass with the use of the superphosphate fertilizer of the present invention applied in the proportion of 1000 pounds per acre.

| Sample | Water | Sulphuric Acid 97% | (Y) Wetting Agent [1] | (X) Dispersing Agent [2] | Phosphate Rock | (Z) Finished Super Phosphate | Percent of X in Z | Yield of Sudan Grass | Percent of Gain in Yield over "A" |
|---|---|---|---|---|---|---|---|---|---|
| A | 10 | 31 | None | None | 50 | 79.5 | None | 100.0 | |
| B | 10 | 31 | 0.009 | None | 50 | 79.5 | None | 95.8 | −4.2 |
| C | 10 | 31 | 0.009 | 0.044 | 50 | 79.5 | 0.055 | 102.3 | +2.3 |
| D | 10 | 31 | 0.009 | 0.088 | 50 | 79.5 | 0.110 | 114.5 | +14.5 |
| E | 10 | 31 | 0.009 | 0.176 | 50 | 79.5 | 0.220 | 122.1 | +22.1 |

[1] Trimethyl nonyl ether of polyethylene glycol.
[2] Sodium lignosulphonate made by the West Virginia Pulp & Paper Co. and designated by it as its "poly F" sodium lignosulphonate.

Applying 500 pounds per acre of finished superphosphate "E" (shown in the above table) in growing green snap beans, the yield was increased 23.5% on a green-weight basis and 17.6% on a dry-weight basis.

The following table shows that the same amount of acid, applied to the same amount of ground phosphate rock, will result in a higher conversion of the phosphate rock to water-soluble phosphates, and that hence a substantially lesser amount of acid (and lesser amount of phosphate rock) is required by my process to produce a given amount of water-soluble phosphate in the end-product. Thus a saving in acid of the order of 10% is effected.

| H$_2$SO$_4$ | | Grams of phosphate rock | Grams of lignosulphonate | Percent of water-soluble acid phosphate in end-product, figured as P$_2$O$_5$ |
|---|---|---|---|---|
| Grams | Wt. percent | | | |
| 32 | 76 | 50 | 0 | 17.6 |
| 32 | 76 | 55 | 0 | 17.5 |
| 32 | 76 | 58 | 0 | 16.8 |
| 32 | 76 | 50 | 0.10 | 18.0 |
| 32 | 76 | 55 | 0.10 | 18.10 |
| 32 | 76 | 58 | 0.10 | 17.10 |

The following table is similar to the last previous table, and shows like increased conversion efficiency when using the aforementioned water-soluble organic particle-dispersing metal-complexing agent comprising modified polyflavonoid copolymers derived from hemlock bark and marketed by Rayonier Incorporated under the trademark "Rayplex."

| H$_2$SO$_4$ | | Grams of phosphate rock | Grams of Rayplex | Percent of water-soluble acid phosphate in end-product, figured as P$_2$O$_5$ |
|---|---|---|---|---|
| Grams | Wt. percent | | | |
| 32 | 76 | 50 | 0 | 17.6 |
| 32 | 76 | 55 | 0 | 17.5 |
| 32 | 76 | 58 | 0 | 16.8 |
| 32 | 76 | 50 | 0.10 | 18.3 |
| 32 | 76 | 55 | 0.10 | 18.00 |
| 32 | 76 | 58 | 0.10 | 17.0 |

Similar improvements in production of water soluble phosphates are obtainable by adding to the acidulating acid (prior to the admixture therewith of phosphate rock) still other tree-derived or bark-derved organic metal-complexing agents having particle-dispersing properties such as "Rayflo–C" marketed by Rayonier, Inc., which is a polyphenolic compound consisting of 15 carbon atom copolymers of catechin and leucocyanidin.

I may also use other non-chelating type water-soluble lignin compounds (other than lignosulphonates) having metal-complexing and particle-dispersing properties, such as the lignin compounds resulting from the alkali pulping process and the lignin compounds resulting from the Kraft pulping process, and the derivatives of such lignin compounds.

While the water-soluble lignosulphonates and other lignin compounds and the water-soluble polyflavonoid copolymers, polyphenolics and wood-sugar acids referred to hereinabove are presently derived from trees (either from the wood thereof or from the bark thereof), such metal-complexing agents, including those which are both metal-complexing agents and particle-dispersing agents (as, for instance, the lignosulphonates and other lignin compounds and the polyflavonoid copolymers and the polyphenolics, mentioned above) may also be derived from other plants rich in or composed predominately of cellulose. Hence, the term tree-derived is intended also to comprehend such compounds derived from other predominately cellulosic plants or plant parts.

The protection of the phosphate fertilizer against reversion to insoluble phosphates is effected by a chemical combination between the metal-complexing agent or the metal-chelating agent and metals in the soil (such as calcium, iron, magnesium, etc.) which would otherwise tend to combine with water-soluble phosphate in the fertilizer to convert it to an insoluble metal phosphate. Such combination between such agents and such metals in the soil may be either one of two general types or categories.

In one category, the metal ion forms a cyclic structure or a closed-ring linkage with the agent, and such sequestering agents or compounds are called chelating agents because they are characterized by the fact that their ligands form more than one point of attachment (namely, plural points of attachment) to the metal ion—the term "chelate" having reference to a ring type linkage with the sequestered or complexed metal.

In the other category, the metal ion does not become linked to the sequestering agent or compound through a ring type linkage but instead becomes attached to the sequestering compound by a non-ring linkage.

In either case, however, the metal ion is no longer free but is instead attached to the sequestering agent or compound.

The term "metal-complexing agent" or "complexing agent" comprehends both such categories of compounds, namely, those to which the metal becomes attached to the compound through a ring type linkage and those to which the metal becomes attached to the compound through a non-ring linkage—the term "metal-chelating agent" or "chelating agent" comprehending only such ring-linkage forming compounds and hence denotes only one species of metal-complexing agents.

I have found that the tree-derived metal-complexing agents which are not also chelating agents, as, for instance, the lignosulphonates resulting from the sulphite pulping process and the lignin compounds resulting from the alkali pulping process and the lignin compounds resulting from the Kraft pulping process and the aforementioned tree-derived polyflavonoid copolymers and polyphenolics all have particle-dispersing properties in addition to their metal-complexing properties. I have also found that the metal-chelating agents referred to hereinabove in foregoing column 4 do not have particle-dispersing properties.

Having described and exemplified my inventions, I claim the following:

1. In the process of acidulating phosphate rock wherein an acid and rock mixture is formed, the improvement which comprises providing in such acid and rock mixture an effective amount of a particle-dispersing agent and an effective amount of a metal-complexing agent.

2. In the process of acidulating the phosphate rock wherein an acid and rock mixture is formed, the improvement which comprises providing in such acid and rock mixture an effective amount of a compound which is both a particle-dispersing agent and a metal-complexing agent.

3. In the process of acidulating the phosphate rock wherein an acid and rock mixture is formed, the improvement which comprises providing in such acid and rock mixture an effective amount of a non-chelating metal-complexing compound having particle-dispersing properties.

4. In the process of acidulating the phosphate rock wherein an acid and rock mixture is formed, the improvement which comprises providing in such acid and rock mixture an effective amount of a tree-derived compound which is both a metal-complexing agent and a particle-dispersing agent.

5. In the process of acidulating the phosphate rock wherein an acid and rock mixture is formed, the improvement which comprises providing in such acid and rock mixture an effective amount of a lignosulphonate and an effective amount of a surfactant.

6. In the method of making a calcium acid phosphate fertilizer by acidulating phosphate rock, wherein a mixture of phosphate rock and acidulating acid is formed and wherein the resultant reaction product is dried, the improvement which comprises providing an effective amount of tree-derived metal-complexing compound in such rock and acid mixture.

7. In the method of making a calcium acid phosphate fertilizer by acidulating phosphate rock, wherein a mixture of phosphate rock and acidulating acid is formed and wherein the resultant reaction product is dried, the improvement which comprises providing an effective amount of a lignosulphonate in such rock and acid mixture.

8. In the method of acidulating phosphate rock wherein an acid and rock mixture is formed and wherein the acidulated end-product is dried, the improvement which comprises providing a lignosulphonate in such acid and rock mixture in the proportion of about one part by weight of lignosulphonate to 300 to 500 parts of acid.

9. In the method of acidulating phosphate rock wherein an acid and rock mixture is formed and wherein the acidulated end-product is dried, the improvement which comprises providing in such acid and rock mixture a lignosulphonate in the proportion of about one part by weight of lignosulphonate to 300 to 500 parts of acid and an effective amount of a surfactant.

10. The method of acidulating ground phosphate rock which includes first bringing into a common solution a lignosulphonate and a surfactant, thereafter mixing such solution with a concentrated acid capable of substantially converting the tricalcium phosphate content of said rock into calcium acid phosphate, and thereafter admixing such concentrated acid (having therein said lignosulphonate and said surfactant) with comminuted phosphate rock in a proportion sufficient for the substantial acidulation of the phosphate rock.

11. The method of acidulating phosphate rock which includes first bringing into a common solution a water-soluble lignosulphonate and a surfactant having a capacity for retarding the precipitation of said lignosulphonate out of the below-stated concentrated acid, the amount of said lignosulphonate in relation to said acid being sufficient to have a substantial dispersing effect upon the solid particles wetted by said acid and the amount of said surfactant in relation to said lignosulphonate and acid being sufficient substantially to prevent the precipitation of said lignosulphonate out of said acid, thereafter mixing the aforementioned solution of said lignosulphonate and surfactant with a concentrated acid selected from the group consisting of sulphuric acid, nitric acid and phosphoric acid thereafter admixing said concentrated acid (having therein said lignosulphonate and said surfactant) with comminuted phosphate rock in a proportion sufficient for the substantial acidulation of the phosphate rock, to form an acid-wetted mass of said rock.

12. The method of making calcium acid phosphate for fertilizer use which includes first bringing into a common solution a water-soluble lignosulphonate and a surfactant having a capacity for retarding the precipitation of said lignosulphonate out of the below-stated concentrated acid, the amount of said lignosulphonate in relation to said acid being sufficient to have a substantial dispersing effect upon the solid particles wetted by said acid and the amount of said surfactant in relation to said lignosulphonate and acid being sufficient substantially to prevent the precipitation of said lignosulphonate out of said acid, thereafter mixing the aforementioned solution of said lignosulphonate and surfactant with a concentrated acid selected from the group consisting of sulphuric acid, nitric acid and phosphoric acid, thereafter admixing said concentrated acid (having therein said lignosulphonate and said surfactant) with comminuted phosphate rock in a proportion sufficient for the substantial acidulation of the phosphate rock, to form an acid-wetted mass of said rock, curing the so wetted mass of rock until the tricalcium phosphate content of said rock has been substantially converted to calcium acid phosphate, and drying the resultant reacted mass.

13. A method of acidulating phosphate rock according to claim 11, in which the proportions of the lignosulphonate and of the surfactant in relation to the acid are not substantially less than of the general order of one part by weight of lignosulphonate and one-tenth part by weight of surfactant to 300 to 500 parts by weight of acid.

14. A method of making clacium acid phosphate for fertilizer use according to claim 12, in which the proportions of the lignosulphonate and of the surfactant in relation to the acid are not substantially less than of the general order of one part by weight of lignosulphonate and one-tenth part by weight of surfactant to 300 to 500 parts by weight of acid.

15. An acidulated phosphate fertilizer having intimately united therewith a water-soluble agent which is both a metal-complexing agent and a particle-dispersing agent—the proportion of said complexing-and-dispersing agent in relation to such fertilizer being not materially less than of the general order of about one pound of said complexing-and-dispersing agent to one ton of such acidulated phosphate fertilizer.

16. An acidulated phosphate fertilizer according to claim 12, in which the proportion of the complexing-and-dispersing agent is not substantially less than of the general order of 0.05 weight-percent of the acidulated phosphate.

17. An acidulated phosphate fertilizer having intimately united therewith a water-soluble tree-derived agent having both metal-complexing and particle-dispersing properties—the proportion of said complexing-and-dispersing agent in relation to such fertilizer being not materially less than of the general order of about one pound of said complexing-and-dispersing agent to one ton of such acidulated phosphate fertilizer.

18. An acidulated phosphate fertilizer having intimately united therewith a water-soluble lignin compound—the proportion of said lignin compound in relation to such fertilizer being not materially less than of the general order of about one pound of said lignin compound to one ton of such acidulated phosphate fertilizer.

19. An acidulated phosphate fertilizer having intimately united therewith a water-soluble lignosulphonate—the proportion of said lignosulphonate in relation to such fertilizer being not materially less than of the general order of about one pound of such lignosulphonate to one ton of such acidulated phosphate fertilizer.

20. An acidulated phosphate fertilizer having intimately united therewith a non-chelating metal-complexing compound having particle-dispersing properties—the proportion of said compound in relation to such fertilizer being not materially less than of the general order of about one pound of such compound to one ton of such acidulated phosphate fertilizer.

References Cited

UNITED STATES PATENTS

| | | | |
|---|---|---|---|
| 1,607,666 | 11/1926 | Dehaen | 71—27 X |
| 2,683,658 | 7/1954 | Saunders | 71—1 |
| 2,744,866 | 5/1956 | Kahler | 210—23 |
| 2,786,746 | 3/1957 | Goldhaar | 71—40 |
| 2,802,728 | 8/1957 | Jaquier | 71—40 |
| 2,844,455 | 7/1958 | Harris | 71—40 |
| 2,929,700 | 3/1960 | Bennet | 71—1 |

OTHER REFERENCES

Arvan, P. G. et al., "Effect of Surface-Active Agents on Preparation of Normal Superphosphate," in Agricultural and Food Chemistry, vol. 3, No. 2 (February, 1955), pp. 131–135.

Perry, J. W. et al., "Surface Active Agents and Detergents," vol. I and vol. II, Interscience, N.Y., 1958 (vol. I, p. 121; vol. II, p. 488 relied on).

DONALL H. SYLVESTER, *Primary Examiner.*

S. LEON BASHORE, *Examiner.*

T. D. KILEY, *Assistant Examiner.*